Figure 1:
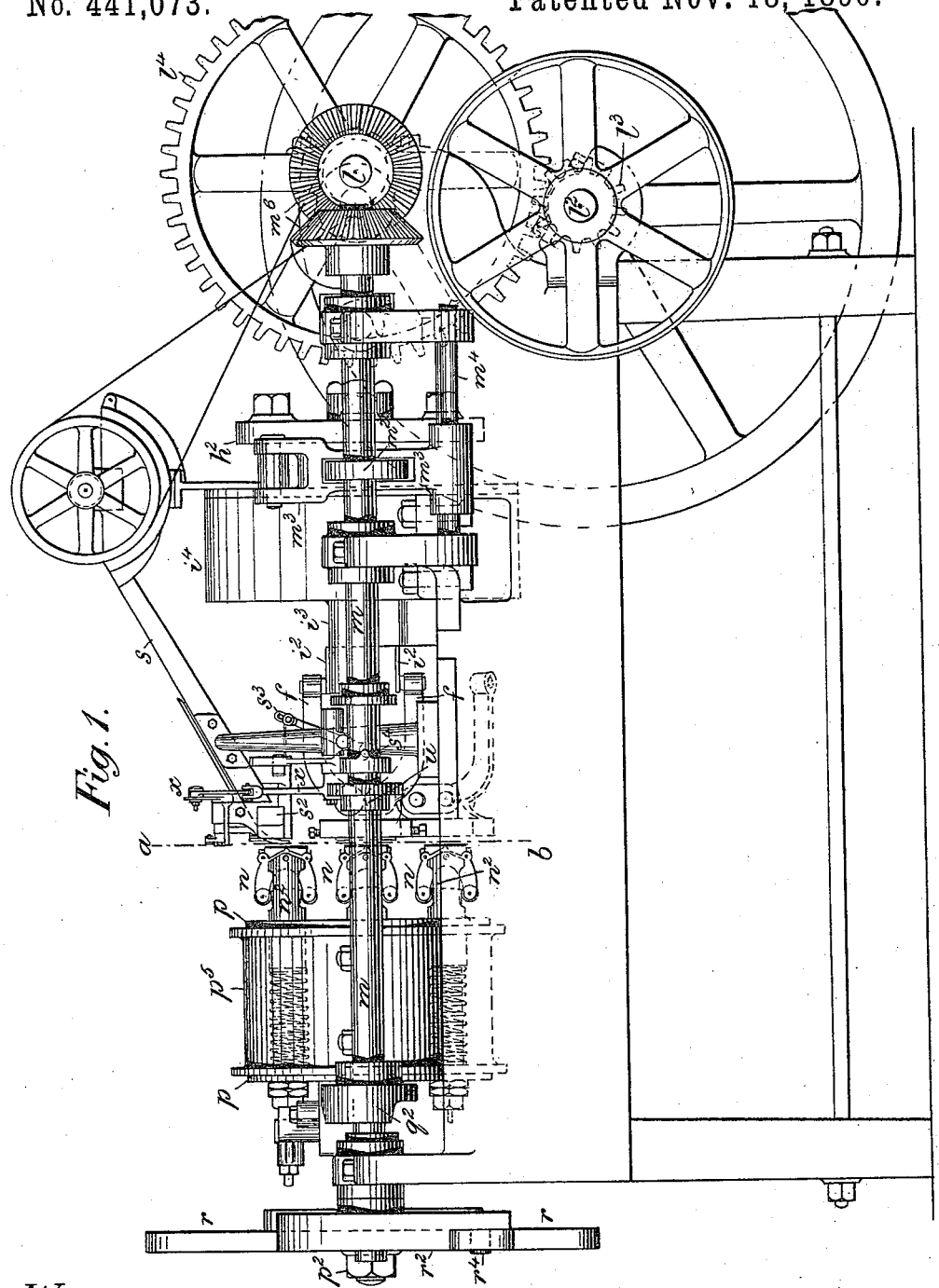

(No Model.) 6 Sheets—Sheet 1.
J. SHELDON.
MACHINERY FOR REDUCING THE DIAMETER AND FOR TAPERING SCREW BLANKS, &c.

No. 441,073. Patented Nov. 18, 1890.

Witnesses:—
Richard Skerrett
Arthur J. Powell

Inventor:—
John Sheldon (No Model.) 6 Sheets—Sheet 2.

J. SHELDON.
MACHINERY FOR REDUCING THE DIAMETER AND FOR TAPERING SCREW BLANKS, &c.

No. 441,073. Patented Nov. 18, 1890.

Witnesses:—
Richard Skerrett
Arthur J. Powell

Inventor:—
John Sheldon.

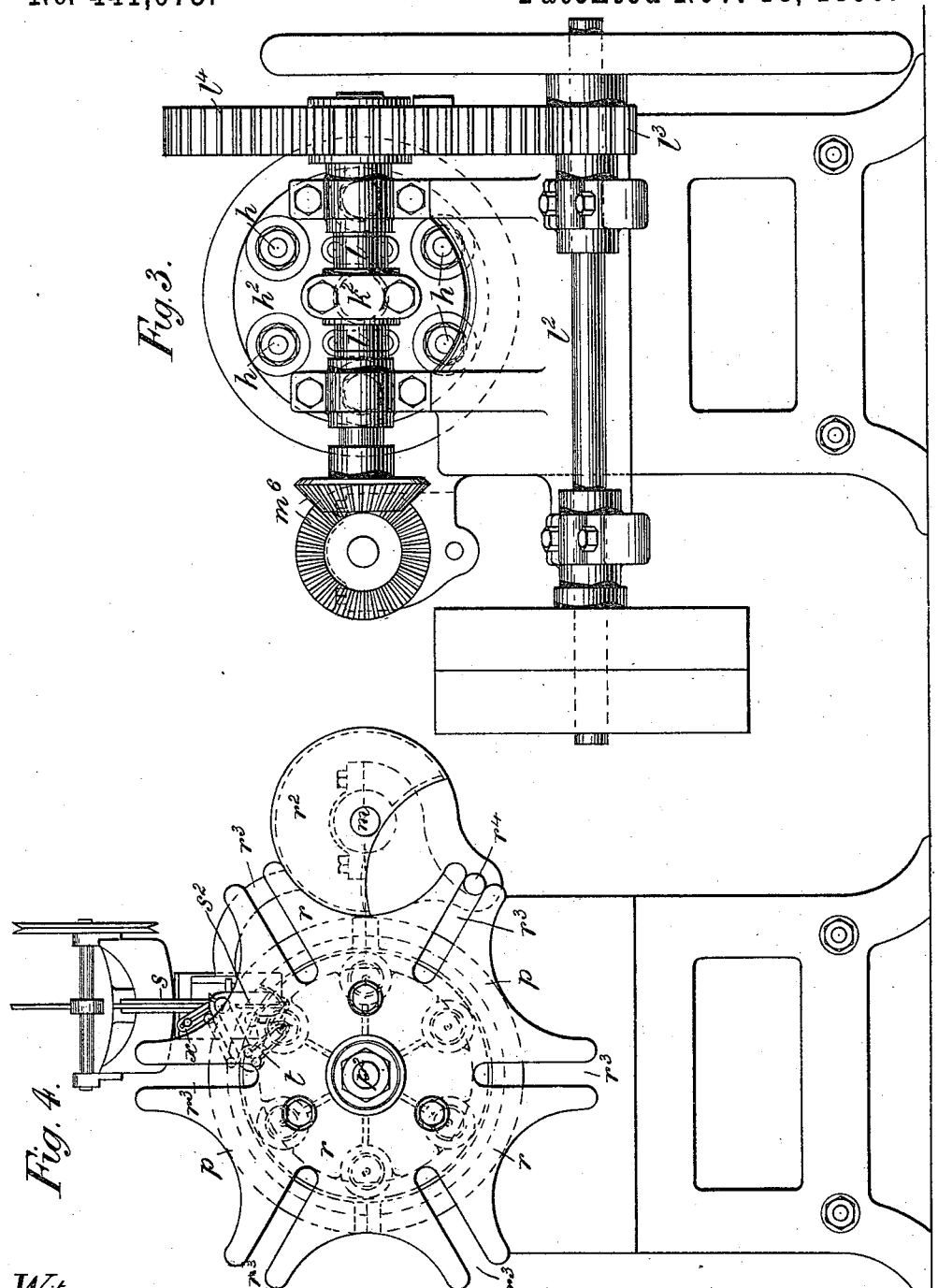

(No Model.) 6 Sheets—Sheet 4.
J. SHELDON.
MACHINERY FOR REDUCING THE DIAMETER AND FOR TAPERING SCREW BLANKS, &c.
No. 441,073. Patented Nov. 18, 1890.
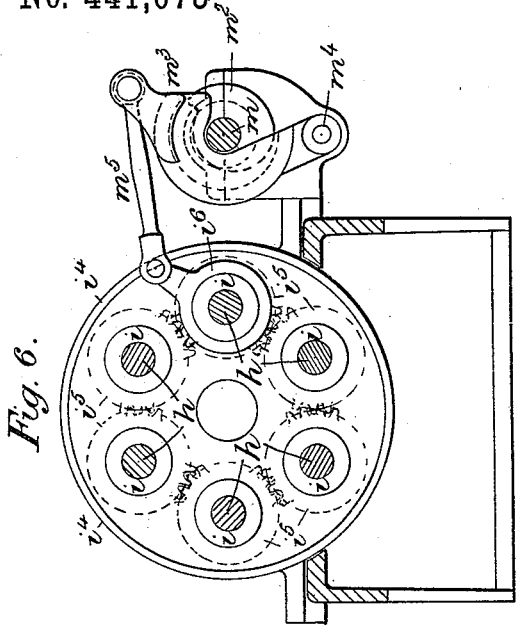
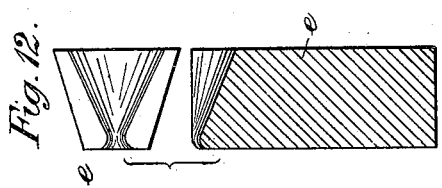
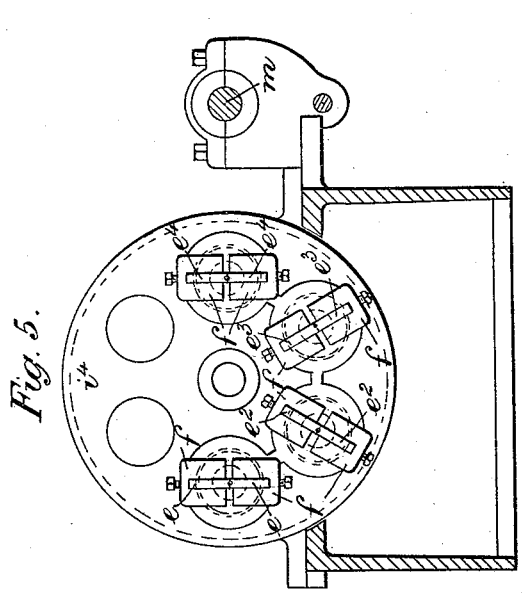
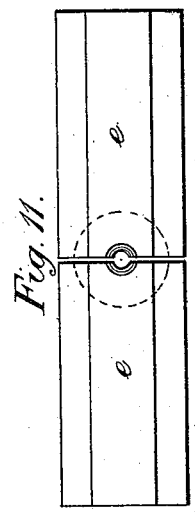
Witnesses:—
Richard Skerrett
Arthur J. Powell
Inventor:—
John Sheldon (No Model.) 6 Sheets—Sheet 5.
J. SHELDON.
MACHINERY FOR REDUCING THE DIAMETER AND FOR TAPERING SCREW BLANKS, &c.
No. 441,073. Patented Nov. 18, 1890.
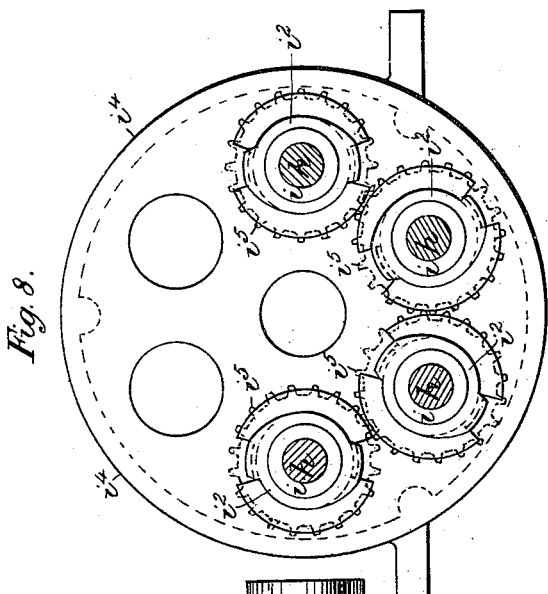
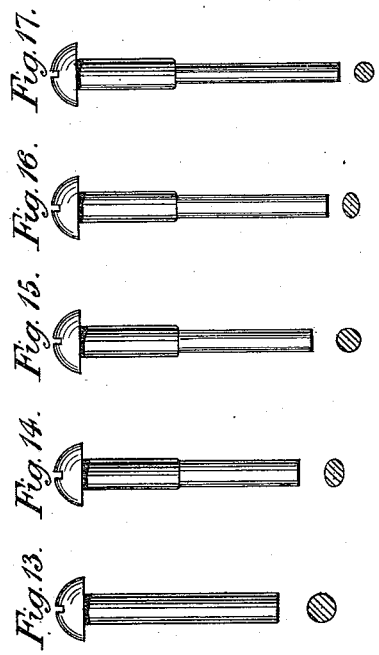
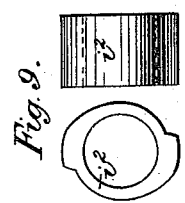
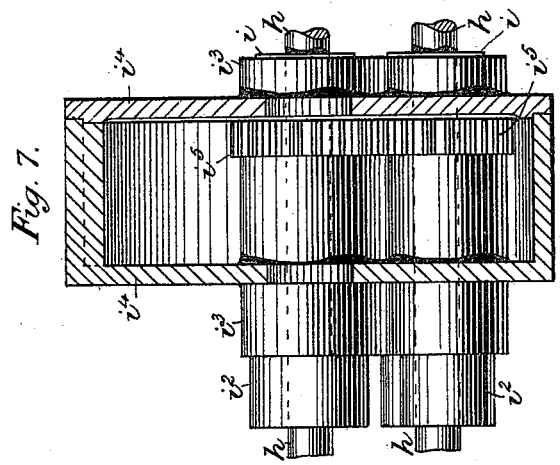
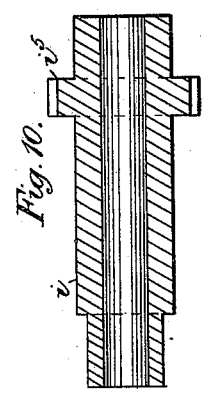
Witnesses:-
Richard Skerrett
Arthur J. Powell
Inventor:-
John Sheldon (No Model.) 6 Sheets—Sheet 6.
J. SHELDON.
MACHINERY FOR REDUCING THE DIAMETER AND FOR TAPERING SCREW BLANKS, &c.
No. 441,073. Patented Nov. 18, 1890.
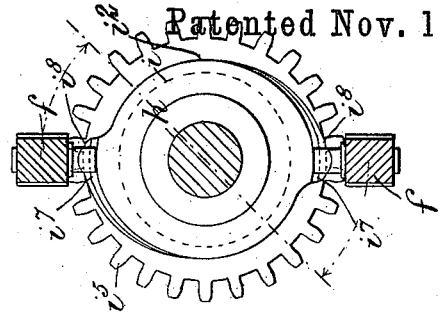
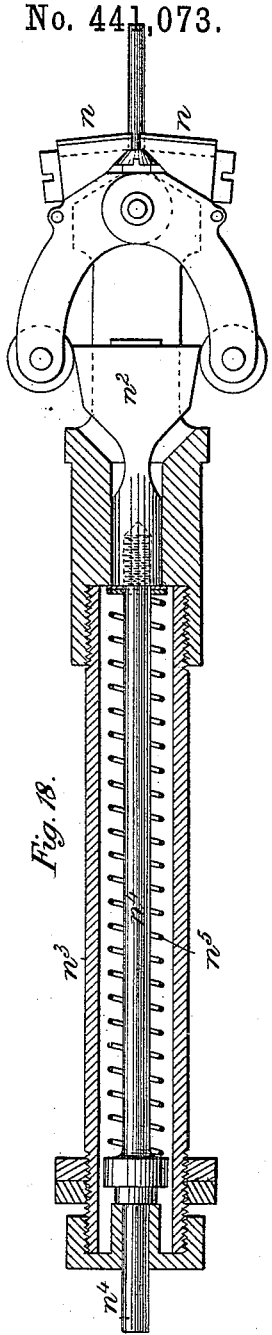
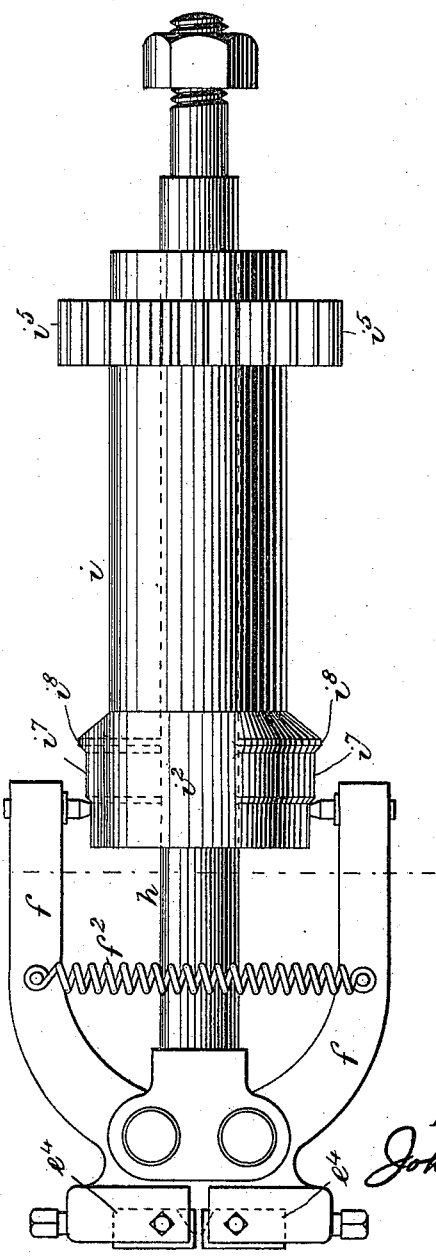
Witnesses:—
J. A. Rutherford
Dennis Sumby
Inventor:—
John Sheldon

UNITED STATES PATENT OFFICE.

JOHN SHELDON, OF BIRMINGHAM, ENGLAND, ASSIGNOR TO NETTLEFOLDS, LIMITED, OF SAME PLACE.

MACHINERY FOR REDUCING THE DIAMETER AND FOR TAPERING SCREW-BLANKS, &c.

SPECIFICATION forming part of Letters Patent No. 441,073, dated November 18, 1890.

Application filed April 8, 1890. Serial No. 347,096. (No model.)

*To all whom it may concern:*

Be it known that I, JOHN SHELDON, of Birmingham, in the county of Warwick, England, a subject of the Queen of Great Britain, have invented certain new and Improved Machinery for Reducing the Diameter of and Pointing Screw-Blanks, Sewing-Machine Needles, Horseshoe-Nails, and for other like Purposes; and I do hereby declare that the following is a full, clear, and exact description of the invention, which will enable others skilled in the art to which appertains to make and use the same.

My invention consists of machinery, the parts of which are constructed and combined and operate substantially in the manner hereinafter described.

Machinery constructed according to my invention is particularly applicable to the preparation of the blanks of wood-screws, the screw-threads of which are formed by pressure. Machinery constructed according to my invention may also be used for various other analogous purposes.

I will describe my invention in connection with blanks for wood-screws.

The working-tools of the machine consist of a pair of symmetrical dies capable of opening and closing upon one another, and which when closed have an "eye" or axial hole elliptical or nearly elliptical in cross-section. The minor axis of the ellipse is less than the diameter of the blank to be operated upon, or the eyes or axial holes in the several tools may be alternately elliptical and circular. These tools or dies are fixed, respectively, on the ends of the short arms of a pair of levers carried by a shaft which slides backward and forward in a sleeve or ring formed with cams at opposite points on its periphery which act upon the long arms of levers that operate the dies. The sleeve or ring oscillates axially or partially rotates back and forth through the arc of a circle, and by the motion of the sleeve the dies are alternately closed upon the blanks and opened by the action of the cams on the sleeve. The dies being open, they advance upon the blank to a distance equal to that portion of the length of the blank to be operated upon. The dies partially close by the action of the levers and cams referred to and thereby change the cylindrical figure of the blank into a figure elliptical in cross-section. The dies thus partially closed upon the blank are drawn toward its ends, on approaching which they are further and rapidly closed upon the end of the blank and a tapering or rough pointing of the blank is thereby effected.

The operation I have described is repeated several times, (preferably four or six,) the blank after each operation being compressed in a plane at right angles to the plane in which it was last compressed—that is, pressure is applied in the line of the major axis of the ellipse, so that the diameter of the blank is reduced in that direction, the blank being brought to or nearly to a cylindrical figure. By the next pressure in the same direction the blank is made elliptical, the direction of the minor axis of the ellipse being that of the major axis of the ellipse first formed. In this way the blank is by a series of operations reduced to the required diameter and roughly pointed without the disturbance of the molecular condition of the metal, which would result if the required reduction of the diameter were effected at one operation.

The repeated operations I have described are effected by employing several pairs of tools operating cams and holders, each operation requiring one set of the said tools and appliances. The holders carrying the blanks are fixed to a drum having an intermittent rotary motion. At each period of rest of the said drum the tools close and operate on the blank. Several blanks are under operation at the same time, each blank being brought in succession under the operation of the successive dies. By the angular motion of the drum carrying the blanks they are made to perform, in passing from one position to the succeeding one, such an angular motion or partial rotation as, in conjunction with the arrangement of the tools and appliances, causes each pair of tools to operate on the blank in the plane of its longest diameter or in a plane at right angles to that in which it was last operated upon and in which it will be next operated upon.

I will now proceed to describe, with reference to the accompanying drawings, the manner in which my invention is to be performed.

Figure 2:
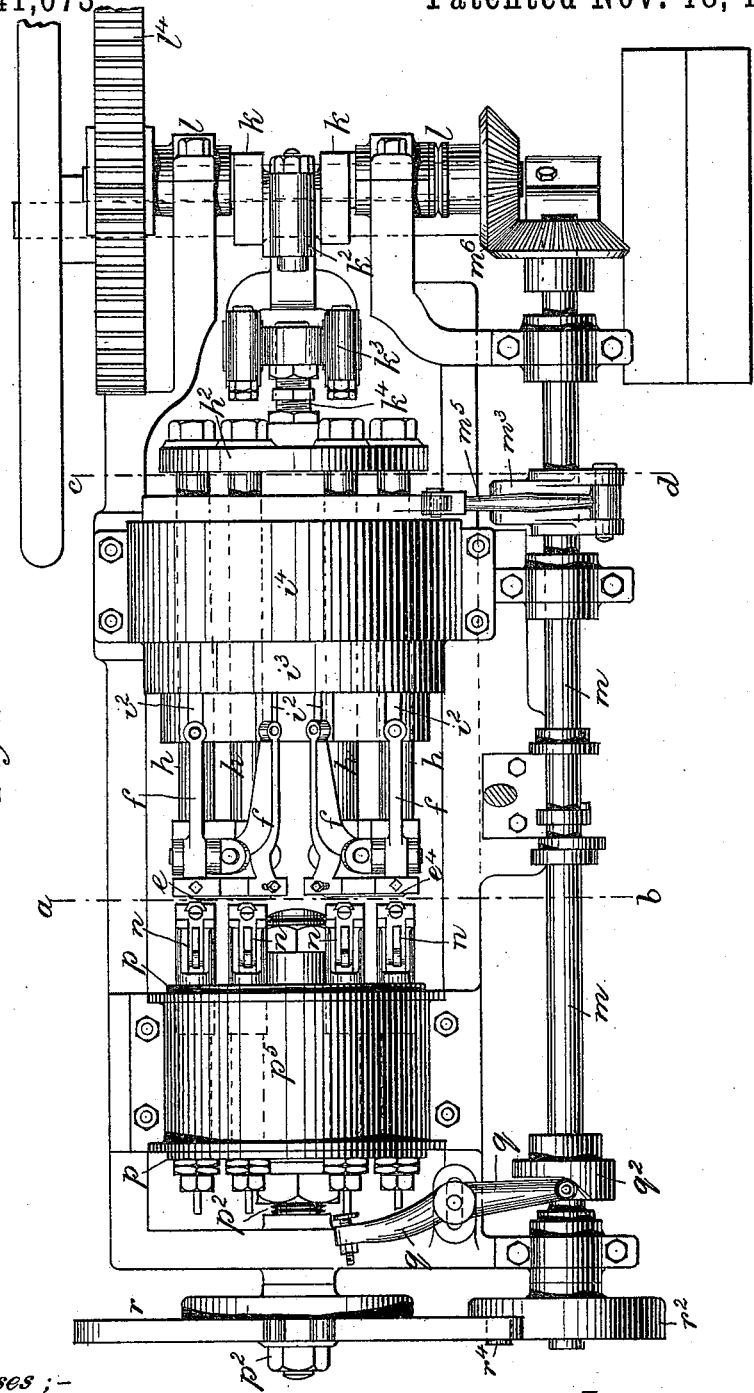

Figure 1 represents in side elevation, and Fig. 2 in plan, machinery constructed according to my invention for reducing the diameter of and pointing screw-blanks. Fig. 3 represents an end elevation of the machinery, taken at the driving-shaft end, and Fig. 4 represents an end elevation of the machinery, taken at the opposite end. Fig. 5 represents a cross-section of the machinery, taken on the line $a\ b$, Figs. 1 and 2, the said Fig. 5 exhibiting in front elevation the series of working or reducing tools and their position with respect to one another; and Fig. 6 represents another cross-section of the machinery, taken on the line $c\ d$, Fig. 2, the said Fig. 6 exhibiting the guide-sleeves carrying the cams by which the working-tools are opened and closed and maintained closed, and the gearing by which the said sleeves are geared together and rotated, as well as the cam and appliances for operating the sleeve-gearing. Fig. 7 represents in longitudinal section the drum in which the sleeves turn, together with their gearing and cams; and Fig. 8 represents a front elevation of the same, the said Figs. 7 and 8 being drawn to a larger scale than the other figures described. Fig. 9 represents one of the sleeve-cams detached, and Fig. 10 represents in longitudinal section one of the sleeves detached, drawn to the same scale as Figs. 7 and 8. Fig. 11 represents one of the pairs of working or reducing tools of the machine, and Fig. 12 represents an end elevation and section of one of the tools, the said tools, Figs. 11 and 12, being drawn to a larger scale than those shown in the machine. Fig. 13 represents the blank before it is operated upon, and Figs. 14, 15, 16, and 17 represent the manner in which the blank, Fig. 13, is successively operated upon by the machine to reduce the diameter of a portion of its shank, as hereinafter particularly explained. Fig. 18 is a longitudinal sectional view, on a larger scale, showing one of the holders with its sliding wedge and spring by which the jaws of the holder are opened and closed. Fig. 19 is a side elevation, and Fig. 20 a transverse sectional view, of one of the pairs of working or drawing tools, showing the sleeve for operating the tool-holding levers.

The same letters of reference indicate the same parts in the several figures of the drawings.

I will describe the machine as arranged for reducing without pointing the diameter of portions of the shanks of screw-blanks.

$e$, $e^2$, $e^3$, and $e^4$ (see Fig. 5) are the four pairs of working-tools of the machine, each pair of tools being carried on the short arms of pairs of levers $f\ f$, which are jointed to snugs or enlargements on the shafts $h\ h$, the several shafts $h\ h$ working through guide-sleeves $i\ i$ and being connected to the disk $h^2$, to which a reciprocating sliding motion is given. The pairs of working tools $e$, $e^2$, $e^3$, and $e^4$ are simultaneously opened and closed for gripping and releasing the several screw-blanks under operation by means of the cams $i^2\ i^2$ on the ends of the sleeves $i\ i$ acting upon the long arms of the levers $f\ f$, on the short arms of which the tools are carried. The said cams have rises at opposite points. (See Figs. 8 and 9.) The sleeves $i\ i$, carrying the cams $i^2\ i^2$, turn in the tubular bearings $i^3$, supported by the fixed drum $i^4$, (see Fig. 7,) and the said sleeves $i\ i$ are geared together by the pinions $i^5\ i^5$ on them. By driving one of the pinions $i^5$ in the manner hereinafter described a reciprocating motion through an angle of about forty-five degrees is simultaneously given to the several sleeves $i\ i$.

It is by this angular motion of the sleeves that the working-tools $e\ e^2\ e^3\ e^4$ are simultaneously opened and closed—that is, when the sleeves $i\ i$ are turned in one direction the rises of the cams $i^2\ i^2$ are brought between and made to separate the long arms of the tool-levers $f\ f$ and thereby close the tools, and when the said sleeves $i\ i$ are turned in the opposite direction, so as to take the rises of the cams out of action, the said tools open by the action of springs, one of which is illustrated in Fig. 19 and is lettered $f^2$.

The term "reciprocating motion" is employed herein to signify a partial rotation or oscillating motion, and inasmuch as the several sleeves $i$ are geared together by the toothed wheels $i^5$ the sleeves are simultaneously moved when motion is given to one of them by the cam or lever mechanism exhibited in Fig. 6.

The shape of the working-tools will be best understood by referring to the enlarged views, Figs. 11 and 12. Each pair of tools consists of two symmetrical dies fixed in holders on the short arms of the operating-levers $f$. The eyes or acting openings of the several pairs of dies are preferably alternately elliptical and circular, or they may all be elliptical, so that the blank is first changed from a circular figure in cross-section to an elliptical figure in cross-section, next from an elliptical figure in cross-section to a circular figure in cross-section, the last pair of dies or tools giving a circular figure in cross-section to the blank.

The reciprocating sliding motion of the several pairs of tools is effected by the crank $k$ on the crank-shaft $l$, connecting-rod $k^2$, crosshead $k^3$, and adjusting connecting-piece $k^4$, the latter being secured to the disk $h^2$, to which the several shafts $h\ h$ are bolted. The crankshaft $l$ is driven from the driving-shaft $l^2$, through the pinion $l^3$ and spur-wheel $l^4$.

The reciprocating angular motion is communicated to one of the pinions $i^5$, gearing the several sleeves $i\ i$ together, by the cam $m^2$ on the counter-shaft $m$ of the machine operating the oscillating arm $m^3$, turning on the center $m^4$, the said arm $m^3$ being connected by the connecting-rod $m^5$ to a collar $i^6$ on one of the sleeves $i$, as best seen in Fig. 6. The counter-shaft $m$ is driven from the crank-shaft $l$ through the bevel-wheels $m^6$.

The several parts of the mechanism which I have described are so arranged that the working-tools are made to close upon the blanks when the said tools have reached the end of their back or return stroke in the direction of the holders of the machine, the forward or advance stroke of the said closed tools upon the blanks in the direction of the end of the blank effecting the drawing or reduction in diameter of the said blanks, as hereinafter explained. During the forward stroke of the tools they are kept closed by the long arms of the tool-levers $f$, traveling upon the rises of the cams $i^2 i^2$. (See Fig. 1 and the enlarged detail view, Fig. 19.)

The holders in which the several screw-blanks are held during the operation of the closed dies or tools $e$ $e^2$ $e^3$ $e^4$ upon them, and while the angular motion is given to the said blanks, are marked $n$ $n$ $n$. The said holders $n$ $n$ $n$ are carried by a drum $p$, fixed on the shaft $p^2$, the said drum working in a fixed cylindrical case or bearing $p^5$. The said drum $p$, carrying the holders $n$, has an intermittent rotary motion given to it and is brought to rest by the mechanism hereinafter described, each movement of the drum carrying it through the sixth of a rotation. By this intermittent motion communicated to the holders, the several blanks carried by them are brought in succession under the operation of the several pairs of tools $e$ $e^2$ $e^3$ $e^4$.

The construction of the holder will be understood by an examination of Fig. 18. Each holder $n$ consists of a pair of levers jointed to the hollow spindle $n^3$, within which a sliding rod $n^4$, carrying at its end the wedge $n^2$, is situated, such wedge-rod being pressed inward or away from the long arms of the holders $n$ by the coil-spring $n^5$. By the inward motion of the sliding wedge $n^2$ acting upon the long arms of the holding-levers the said arms are separated and the short arms closed upon the blank, and by the pressing outward of the wedge-rod the holder is opened, each pair of levers being opened to release the finished blank by means of the cam-lever $q$, operated by the cam $q^2$ on the counter-shaft $m$, the inner arm of the said cam-lever acting against the outer end of the rod carrying the wedge $n^2$, when by the intermittent motion of the drum $p$ the said holder has come to rest and brought the said rod opposite the said cam-lever $q$. (See Fig. 2.)

The intermittent motion of the drum $p$, carrying the holders $n$, is effected by the stop-wheel $r$ on the shaft $p^2$ of the drum $p$ and the stud-wheel $r^2$ on the end of the counter-shaft $m$. (See Fig. 4.) The said stop-wheel $r$ is provided with six radial slots $r^3$ $r^3$, in which the stud $r^4$ on the rotating stud-wheel $r^2$ successively engages to give motion through a sixth of a rotation to the said stop-wheel $r$, and consequently to the drum $p$, carrying the holders $n$. On the stud $r^4$ escaping from the slot $r^3$ the circular edge of the stud-wheel $r^2$ works in one of the curved recesses in the stop-wheel $r$, and thereby prevents the further rotation of the said stop-wheel, drum, and holders until the stud $r^4$ engages with another of the slots $r^3$, as will be understood by an examination of Fig. 4.

The screw-blanks to be operated upon descend by their own weight down the slotted rail $s$ and are received in the cup $s^2$. The blank in the cup $s^2$, now horizontal, is pushed head foremost by the lever $s^3$, and its horizontal rod operated by the cam $s^4$ on the shaft $m$, into one of the holders $n$ in the drum $p$, which drum has come to rest. The holder $n$ closing grips the blank, and by the step-like or intermittent motion of the drum $p$ the blank is carried in succession opposite the several pairs of tools $e$ $e^2$ $e^3$ $e^4$ to be operated upon by the said tools. After the blank has been finally operated upon a discharger or pair of fingers $t$ descends by the action of the cam $u$ through the lever and parts at $x$ and seizes the blank, the holder $n$ opening to release it. The blank is carried by the said discharger or pair of fingers $t$ out of the range of the tools, and the jaws of the said discharger opening the blank falls into a receiver, by which it is carried out of the machine and dropped into a receptacle.

The discharging mechanism as well as the feeding mechanism differ in no essential respect from mechanisms used for similar purposes in screw-threading or worming machines, and I therefore do not think it necessary more fully to describe the same.

I will now describe the action of the machine upon one blank: A blank of the kind represented in Fig. 13 having been fed to one of the holders $n$, the said holder closes upon it, and by the intermittent motion of the drum $p$ the said blank is carried opposite, say, the pair of tools $e$ and comes to rest. The tools $e$ being open make their back or return sliding motion in the manner before described, so that the open tools pass onto the blank to a distance equal to that portion of the length of the blank to be operated upon. The tools $e$ now partially close upon the blank by the action of the cams $i^3$ and the mechanism hereinbefore described, and afterward make their advance sliding motion—that is, move toward the end of the blank. By the pressure and traveling of the nearly-closed tools $e$ upon the blank the cylindrical form of that part of the blank to be wormed is changed into an elliptical form in cross-section, as represented in Fig. 14. The tools $e$ having thus operated upon the blank, open, and by the angular motion of the drum $p$ the partially-reduced blank, Fig. 14, is carried opposite the second pair of tools $e^2$ and comes to rest. The said second pair of tools $e^2$ now operate upon the blank in a plane at right angles to the plane in which the first pair of tools $e$ operated upon it, so as to give the reduced portion of the blank a cylindrical figure, as represented in Fig. 15. The blank, Fig. 15, is next carried opposite to and operated upon by the pair of tools $e^3$, which act upon it in the same direction as the pair of tools $e^2$, so as to give the reduced portion of the blank the elliptical form represented in Fig. 16. The blank, Fig. 16, is next carried opposite to and operated upon by the fourth pair of tools $e^4$. By the action of each pressure is applied to the blank in a line of the major axis of the ellipse, so as to give the reduced part of the blank the cylindrical form represented in Fig. 17. Thus each pair of tools operates on the blank in the plane of its largest diameter, or in a plane at right angles to that in which it was last operated upon and in which it will be next operated upon, as will be understood by an examination of Figs. 13, 14, 15, 16, and 17. By the operations described the blank is lengthened and the portion of the blank operated upon has a cylindrical figure of a reduced diameter.

Although for convenience of description I have described the successive operations of the tools $e\ e^2\ e^3\ e^4$ upon one blank, yet it must be understood that four blanks are under operation at the same time, each blank being brought in succession under the operation of the successive tools.

More than four pairs of working-tools may be used in the machine.

When the screw-blanks are to be pointed, as well as portions of their length reduced in diameter, the tools $e\ e^2\ e^3\ e^4$, as they approach the end of the blanks, are further and rapidly closed on the blanks and a tapering or rough pointing of the blanks thereby effected. For this purpose I construct one or more of the sleeve-cams in the manner illustrated in Fig. 19. In this sleeve I provide the rises $i^7\ i^7$, by which the closing of the tools is effected, on which rises the arms of the tools travel during the reducing operation. The inclines $i^8\ i^8$ are made for rapidly closing the tools for the pointing operation—that is to say, after the drawing-down or reducing tools have traveled nearly to the end of the blank the arms of the said tools travel up the said inclines $i^8\ i^8$ behind the rises $i^7\ i^7$ and thereby rapidly close the tools upon the end of the blank and effect the pointing of the said blank.

The application of my invention to purposes other than the treatment of screw-blanks—such, for example, as the reducing and pointing of sewing-machine needles, horseshoe-nails, and like articles—differs in no essential respect from its application to screw-blanks, as hereinbefore described and illustrated.

Having now particularly described my invention and the manner in which the same is to be performed, I declare that I claim as my invention of new or improved machinery for reducing the diameter of and pointing screw-blanks, sewing-machine needles, and horseshoe-nails, and for other like purposes—

1. In machinery for reducing the diameter of and pointing screw-blanks, the combination, with an annular series of compressing dies or tools and means for supporting and operating the same, of a corresponding series of blank-holders, a drum for carrying such holders, and means for supporting such drum and imparting to it an intermittent rotary motion, substantially as described.

2. In machinery for reducing the diameter of and pointing screw-blanks, the combination, with holders for holding the blanks to be operated upon, of a series of shafts having levers pivoted on one end and carrying the operating-tools, sleeves encircling such shafts, means for imparting to such sleeves a partial rotation or oscillating motion, cams carried by said sleeves adapted to operate said levers and tools, means for keeping said tools in an open position, and means for imparting a longitudinal reciprocal movement to said sleeve-carrying shafts, substantially as described.

3. In machinery for reducing the diameter of and pointing screw-blanks, the combination of an annular series of compressing-dies and a corresponding series of blank-holders arranged and operated so that the latter series is intermittently rotated to bring each blank in succession into such relation with each pair of dies that each blank will be in each operation compressed or reduced in a direction at right angles to that in which it was last operated upon and in which it will be next operated upon, substantially as described.

4. In machinery for reducing the diameter of and pointing screw-blanks, the combination, with shafts carrying compressing-dies arranged in an annular series, and means for supporting such shafts and operating said dies, of the disk $h^2$, to which such shafts are connected, the adjustable connecting-piece $k^4$, and mechanism for imparting a reciprocating motion to the same, substantially as described.

JOHN SHELDON. [L. S.]

Witnesses:
RICHARD SKERRETT,
ARTHUR J. POWELL.